United States Patent
Mei et al.

(10) Patent No.: US 11,945,096 B2
(45) Date of Patent: Apr. 2, 2024

(54) PRODUCT CONVEYANCE ROBOT

(71) Applicant: TOYOTA JIDOSHA KABUSHIKI KAISHA, Aichi-ken (JP)

(72) Inventors: Zixun Mei, Tokyo (JP); Satoshi Okamoto, Musashino (JP); Takuya Watabe, Chofu (JP); Shinya Sakurai, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 793 days.

(21) Appl. No.: 17/070,847

(22) Filed: Oct. 14, 2020

(65) Prior Publication Data

US 2021/0114226 A1   Apr. 22, 2021

(30) Foreign Application Priority Data

Oct. 16, 2019   (JP) .................................. 2019-189222

(51) Int. Cl.
  *B25J 9/18*   (2006.01)
  *B25J 5/00*   (2006.01)
  *B25J 11/00*  (2006.01)
  *G05B 19/19*  (2006.01)
  *B60P 9/00*   (2006.01)

(52) U.S. Cl.
  CPC ............. *B25J 11/008* (2013.01); *B25J 5/007* (2013.01); *B60P 9/00* (2013.01)

(58) Field of Classification Search
  CPC ............................... B25J 11/008; B25J 5/007

USPC .................................................. 318/568.11
See application file for complete search history.

(56) References Cited

U.S. PATENT DOCUMENTS

| | | | |
|---|---|---|---|
| 10,386,850 B2 * | 8/2019 | Heinla | G06T 7/579 |
| 2004/0006408 A1 | 1/2004 | Kakutani et al. | |
| 2018/0194411 A1 * | 7/2018 | Liivik | G05D 1/021 |
| 2018/0327237 A1 * | 11/2018 | Sibley | B25J 9/1694 |
| 2019/0369641 A1 * | 12/2019 | Gillett | G05D 1/0027 |
| 2021/0102817 A1 * | 4/2021 | Kim | G01C 21/3407 |

FOREIGN PATENT DOCUMENTS

| | | |
|---|---|---|
| CN | 107444235 A | 12/2017 |
| CN | 109746894 A | 5/2019 |
| CN | 109940577 A | 6/2019 |
| JP | H10139172 A | 5/1988 |
| JP | 2000190882 A | 7/2000 |
| JP | 2001287183 A | 10/2001 |
| JP | 200421693 A | 1/2004 |
| JP | 6336235 B1 | 6/2018 |

* cited by examiner

*Primary Examiner* — Erick D Glass
(74) *Attorney, Agent, or Firm* — HAUPTMAN HAM, LLP

(57) ABSTRACT

A product conveyance robot includes: a travel portion configured to travel on a road surface; a holding portion provided above the travel portion and configured to hold a product, the holding portion being provided rotatably around a lateral turn axis extending in the height direction of the holding portion; and a controller configured to control driving of the travel portion and a rotation angle of the holding portion around the lateral turn axis.

9 Claims, 10 Drawing Sheets

US 11,945,096 B2

PRODUCT CONVEYANCE ROBOT

INCORPORATION BY REFERENCE

The disclosure of Japanese Patent Application No. 2019-189222 filed on Oct. 16, 2019 including the specification, drawings and abstract is incorporated herein by reference in its entirety.

BACKGROUND

1. Technical Field

The present specification describes a product conveyance robot including a travel portion and a holding portion, the travel portion being configured to travel on a road surface, the holding portion being provided above the travel portion and configured to hold a product.

2. Description of Related Art

In recent years, there have been proposed product conveyance robots configured to convey a product by use of an autonomously mobile robot. For example, Japanese Patent No. 6336235 (JP 6336235 B) describes a product conveyance robot configured to autonomously convey a product. More specifically, the product conveyance robot of JP 6336235 B includes a travel portion and a square ring-shaped body portion (corresponding to a holding portion). A basket, a box, or a tray in which the product is stored or placed is attached in an attachable and detachable manner to an opening penetrating through the body portion.

Further, in recent years, there have been proposed a lot of product conveyance robots each including a solid container (corresponding to a holding portion) above a travel portion and configured to convey a product such that the product is stored in the container. By storing a storage box or the like in the solid container as such, it is possible to prevent fall and theft of the storage box or the like in the course of conveyance.

SUMMARY

In the meantime, a condition requested to the holding portion of such a product conveyance robot varies depending on a state. For example, the holding portion is requested to be compact so that the holding portion does not protrude outwardly from the travel portion when the product conveyance robot travels. Further, when the product conveyance robot reaches in front of a user at a delivery source or a delivery destination, the user accesses the inside of the holding portion so that the user puts a product in or out of the holding portion. At this time, the holding portion is requested to have a form that allows the user to easily access the inside of the holding portion placed in front of the user without changing a standing position or orientation of the user.

Thus, the requested condition for the form of the holding portion varies depending on the state of the product conveyance robot. When such various conditions are to be satisfied, there is a large restriction in design of the holding portion.

In view of this, the present specification describes a product conveyance robot that can reduce a restriction in design of a holding portion.

A product conveyance robot described in the present specification includes a travel portion, a holding portion, and a controller. The travel portion is configured to travel on a road surface. The holding portion is provided above the travel portion and configured to hold a product, the holding portion being provided rotatably around a lateral turn axis extending in the height direction of the holding portion. The controller is configured to control driving of the travel portion and a rotation angle of the holding portion around the lateral turn axis.

With such a configuration, the orientation of the holding portion can be changed in accordance with a state. Hereby, even if the holding portion does not have a special design, the holding portion can respond to various requests by changing its posture, thereby making it possible to reduce a restriction in design of the holding portion. Further, a message from the product conveyance robot to people around the product conveyance robot can be transferred by "motion" of the holding portion, so that people can easily have a friendly feeling to the product conveyance robot.

In this case, a width-direction dimension of the holding portion may be larger than a front-rear-direction dimension of the holding portion. A takeout opening via which the product is put in and out of the holding portion may be provided on at least a front face of the holding portion. The controller may control the rotation angle of the holding portion around the lateral turn axis such that both side faces of the holding portion face the front-rear direction of the product conveyance robot during traveling, and the front face of the holding portion faces forward from the product conveyance robot when the product is put in or out of the holding portion.

The side faces of the holding portion, the side faces having a small horizontal dimension, face the front-rear direction of the product conveyance robot during traveling, and therefore, even when the product conveyance robot approaches a user, the user can hardly have a feeling of pressure. Meanwhile, the front face having the takeout opening faces forward from the product conveyance robot when a product is put in or out of the holding portion, and therefore the user can put the product in or out of the holding portion without changing a standing position or orientation of the user, thereby making it possible to reduce a work load to the user.

In this case, a side display on which an image is displayed may be provided on at least one of the side faces of the holding portion.

When the product conveyance robot travels, the side faces of the holding portion face forward and rearward from the product conveyance robot. In a case where the displays are provided on the side faces, people around the product conveyance robot can watch content displayed on the display even if they do not move together with the product conveyance robot to watch the content on the display. That is, in a case where the displays are provided on the side faces of the holding portion, more people can watch the content on the display for longer time in comparison with a case where the display is provided on the front face or a rear face of the holding portion.

In this case, the holding portion may have a square ring body configured to penetrate the holding portion in the front-rear direction and to hold one or more products inside the ring body.

In a case of the ring body, the holding portion can be reduced in weight and size in comparison with a container. Note that, in a case of the ring body, a "surface" on which the display can be provided is limited in comparison with the container. However, in a case where the holding portion is provided with the ring body, the side displays are provided on side faces of the ring body, and the side faces face the front-rear direction of the product conveyance robot at the time when the product conveyance robot travels, it is possible to secure a display effective for alerting and advertising while the holding portion is reduced in weight and size.

Further, the holding portion may be provided to be swingable relative to the travel portion around a vertical turn axis extending in the width direction of the product conveyance robot. The controller may be configured to also control a swing angle of the holding portion around the vertical turn axis.

With such a configuration, it is possible to appropriately maintain the inclination of the holding portion relative to a horizontal plate in accordance with a state of the product conveyance robot. Further, more messages can be transferred from the product conveyance robot to people around the product conveyance robot by "motion" of the holding portion, so that people can more easily have a friendly feeling to the product conveyance robot.

The product conveyance robot described in the present specification makes it possible to reduce a restriction in design of the holding portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
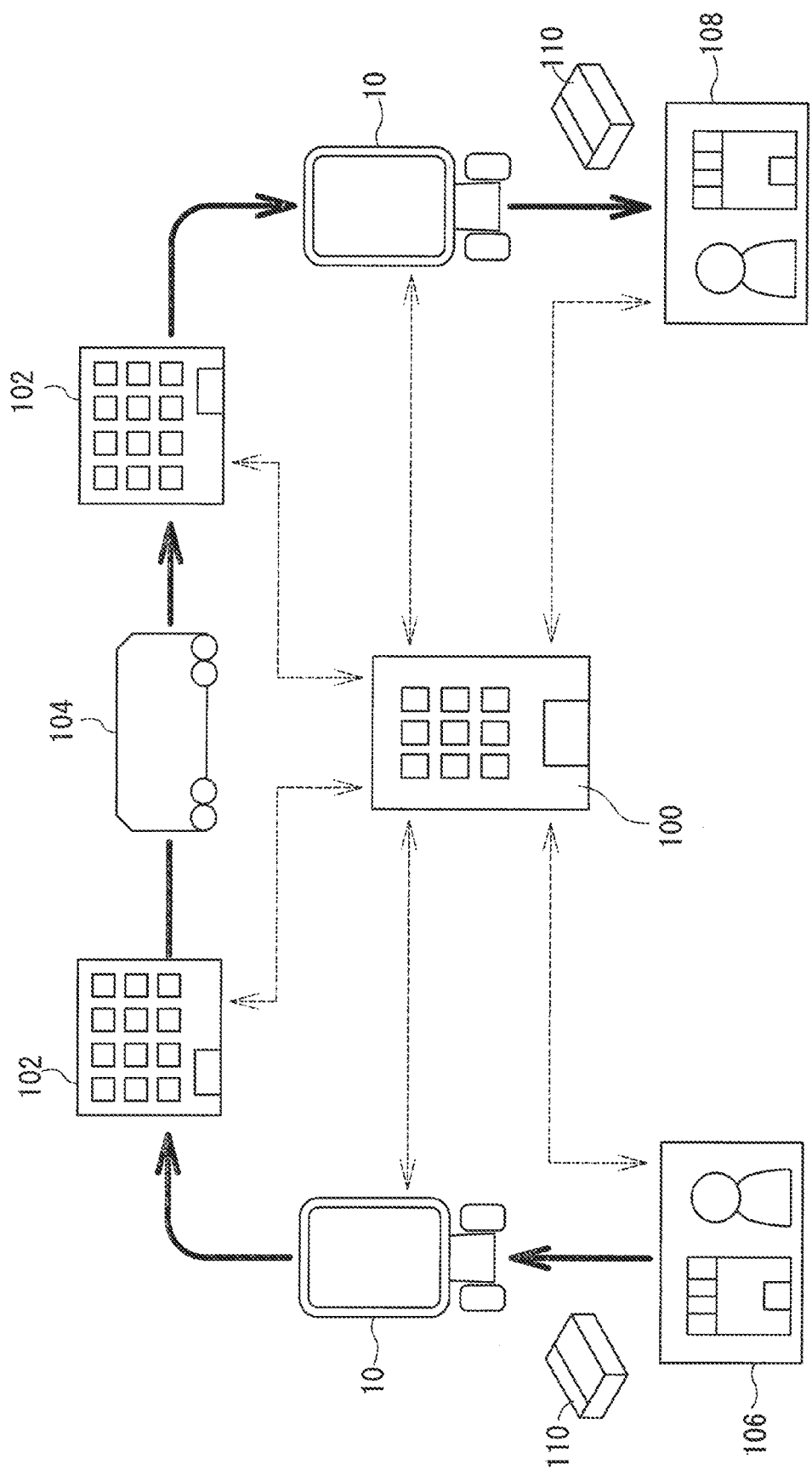
FIG. 1 is a view illustrating a delivery state of a product by use of a product conveyance robot.

With reference to drawings, the following describes a configuration of a product conveyance robot 10. FIG. 1 is a view illustrating a delivery state of a product 110 by use of the product conveyance robot 10. As will be described later more specifically, the product conveyance robot 10 is a mobile robot that can hold the product 110 and autonomously travel on a general road and an indoor passage. In an example illustrated herein, the product conveyance robot 10 is used to convey the product 110 from a delivery source 106 to a relay point 102 or from the relay point 102 to a delivery destination 108. A management center 100 receives a request of product conveyance from an individual or a company as the delivery source 106 or from the relay point 102 of logistics. Such a conveyance request is sent by communication via the Internet, for example. Upon receipt of the conveyance request, the management center 100 moves the product conveyance robot 10 to the delivery source 106. The product conveyance robot 10 receives the product 110 at the delivery source 106 and conveys it to the relay point 102 nearest from the delivery source 106.

The product 110 is transported from the relay point 102 nearest from the delivery source 106 to the relay point 102 nearest from the delivery destination 108 by use of a general logistic system using a transport truck 104 or the like. The product 110 is conveyed again by use of the product conveyance robot 10 from the relay point 102 nearest from the delivery destination 108 to the delivery destination 108. At this time, the management center 100 may receive a request such as a delivery request time from the relay point 102 or the individual or the company as the delivery destination 108. Based on an instruction from the management center 100, the product conveyance robot 10 conveys the product 110 from the relay point 102 to the delivery destination 108.

Note that the usage mode of the product conveyance robot 10 as described herein is an example and may be changed appropriately. For example, in the abovementioned example, the product 110 is delivered to the delivery destination 108 via the relay point 102. However, the product conveyance robot 10 may convey the product 110 received from the delivery source 106 directly to the delivery destination 108 without going through the relay point 102.

Figure 2:
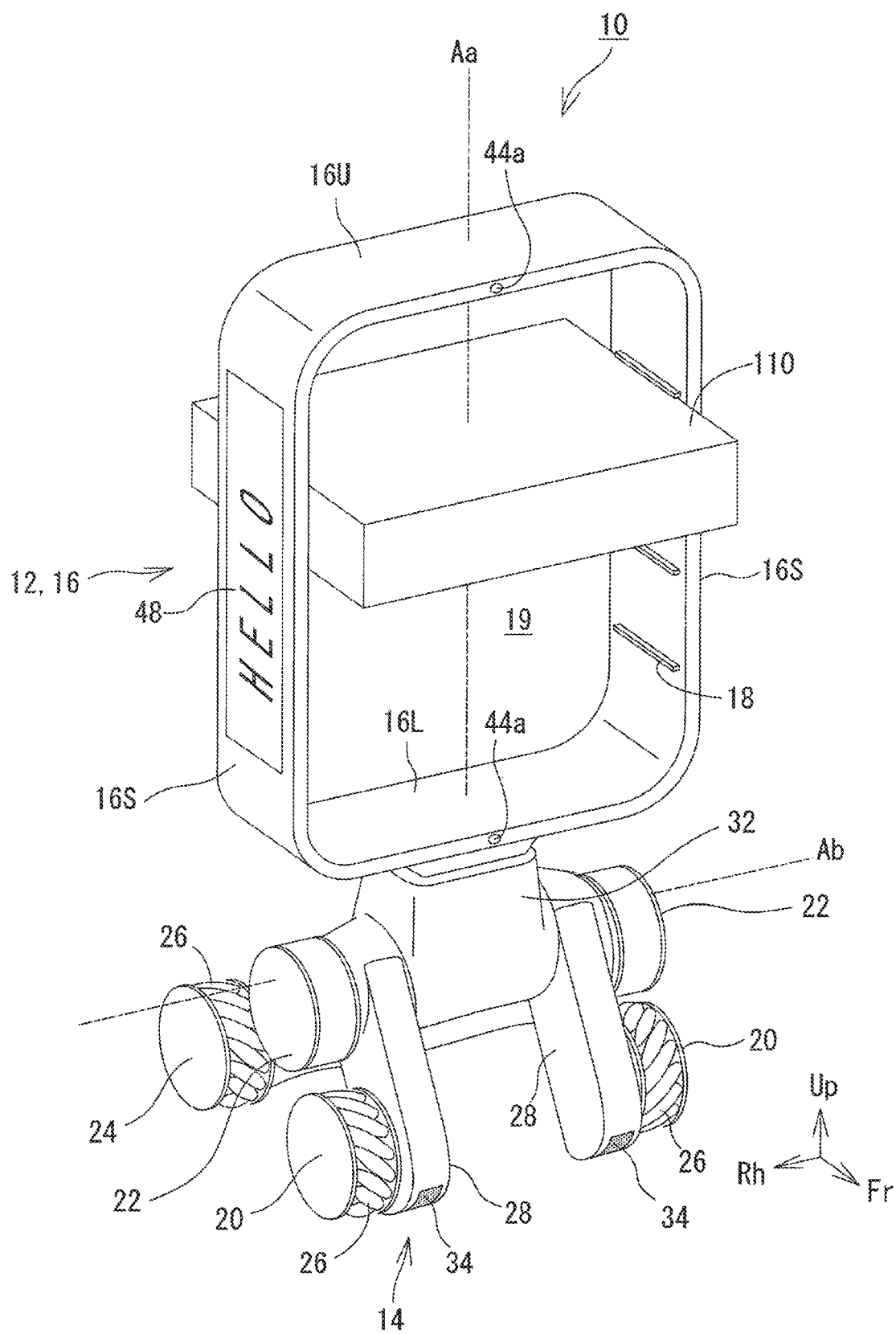
FIG. 2 is a perspective view of the product conveyance robot in a state where a holding portion is lifted.
Figure 3:
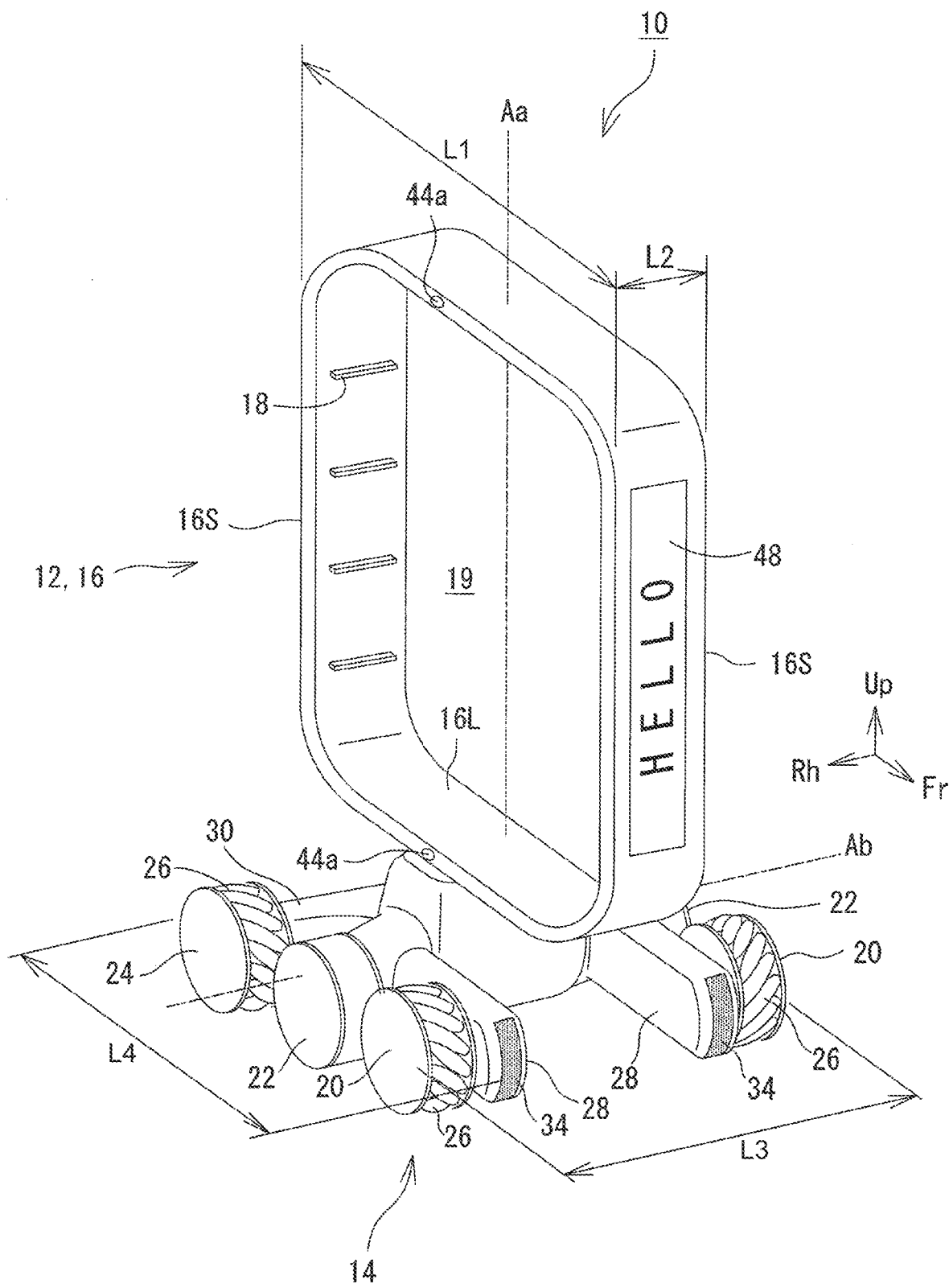
FIG. 3 is a perspective view of the product conveyance robot in a state where the holding portion laterally turns.

Next will be described a configuration of the product conveyance robot 10. FIGS. 2 and 3 are perspective views of the product conveyance robot 10. Note that, in the following description, a "front-rear direction," a "width direction," and a "height direction" indicate the front-rear direction, the width direction, and the height direction of the product conveyance robot 10 unless otherwise specified. Further, the front-rear direction of the product conveyance robot 10 is an aligning direction of a front wheel 20 and a rear wheel 24, the width direction of the product conveyance robot 10 is an aligning direction of a right front wheel 20 and a left front wheel 20, and the height direction of the product conveyance robot 10 is a direction perpendicular to the front-rear direction and the width direction. Further, in the following drawings, "Fr," "Up," and "Rh" indicate a front side, an upper side, and a right side of the product conveyance robot 10, respectively.

The product conveyance robot 10 is roughly divided into a travel portion 14 including a plurality of wheels, and a holding portion 12 provided above the travel portion 14. The holding portion 12 in the present example includes a ring body 16 having a square ring shape. The ring body 16 includes a pair of side members 16S extending in the height direction, an upper lateral member 16U configured to connect upper ends of the side members 16S to each other, and a lower lateral member 16L configured to connect bottom ends of the side members 16S to each other.

Here, as will be described later more specifically, and as apparent from comparison between FIGS. 2 and 3, the holding portion 12 is rotatable around a lateral turn axis Aa extending in the height direction of the holding portion 12. Further, the holding portion 12 is swingable around a vertical turn axis Ab extending in the width direction of the product conveyance robot 10. In the following description, a motion of the holding portion 12 to rotate around the lateral turn axis is called "lateral turn," and a motion of the holding portion 12 to swing around the vertical turn axis Ab is called "vertical turn."

When the holding portion 12 laterally turns or vertically turns, the front-rear direction, the width direction, and the height direction of the whole product conveyance robot 10 become different from the front-rear direction, the width direction, and the height direction of the holding portion 12 alone. In view of this, in the following description, in a case where a direction based on the holding portion 12 is mentioned, the "direction" will be described together with an annotation, "of the holding portion 12" (for example, "the front-rear direction of the holding portion 12"). When the annotation, "of the holding portion 12," is not described, the direction indicates a direction of the whole product conveyance robot 10. Note that the "front-rear direction of the holding portion 12" is a penetration direction of the ring body 16, the "width direction of the holding portion 12" is an aligning direction of the side members 16S, and the "height direction of the holding portion 12" is a direction perpendicular to the front-rear direction and the width direction of the holding portion 12. Accordingly, in FIG. 2, the front-rear direction of the holding portion 12 is the same as the front-rear direction of the whole product conveyance robot 10. In the meantime, in FIG. 3, the front-rear direction of the holding portion 12 is rotated by 90 degrees from the front-rear direction of the whole product conveyance robot 10.

A width-direction dimension L1 (see FIG. 3) of the holding portion 12 is sufficiently larger than a front-rear-direction dimension L2 of the holding portion 12. Further, the width-direction dimension L1 of the holding portion 12 is slightly larger than a width-direction dimension L3 of the travel portion 14 and smaller than a front-rear-direction dimension L4 of the travel portion 14. In the meantime, the front-rear-direction dimension of the holding portion 12 is sufficiently smaller than the width-direction dimension L3 and the front-rear-direction dimension L4 of the travel portion 14. Accordingly, when the front-rear direction of the product conveyance robot 10 is along the front-rear direction of the holding portion 12, the holding portion 12 slightly protrudes outwardly from the travel portion 14 in a plan view. In the meantime, in a case where the front-rear direction of the holding portion 12 is rotated by 90 degrees from the front-rear direction of the product conveyance robot 10, the holding portion 12 fits within an outer shape of the travel portion 14 in a plan view.

The product 110 targeted for conveyance is held inside the ring body 16. In the example illustrated herein, the side members 16S are provided with a plurality of support rails 18, so the product 110 having a box shape is supported by the support rails 18 from below. In this case, the product 110 is conveyed in a state where at least part of the product 110 is exposed to outside the ring body 16. Further, the product 110 is put in and out through a through-hole of the ring body 16. Accordingly, the through-hole of the ring body 16 functions as a takeout opening 19 via which the product 110 is put in and out. Note that the holding mode of the product 110 as described herein is an example and may be changed appropriately. For example, a hook or the like may be provided in the upper lateral member 16U of the ring body 16, so that the product 110 having a pouched shape with a carrying handle is held by the hook in a hanging manner. Further, the holding portion 12 may have a locking mechanism for preventing fall and theft of the product 110 thus held. For example, the ring body 16 may be provided with a lock pin or the like electrically controlled such that the lock pin projects when the product 110 is set. In this case, the lock pin projects and engages with part of the product 110 (or a storage container in which the product 110 is stored).

Here, it is also conceivable that a container in which the product 110 is completely stored is provided instead of the ring body 16. However, in a case of the container, the size of the holding portion 12 increases, so that its weight easily increases. In the meantime, in a case of the ring body 16 that holds the product 110 in a state where part of the product 110 is exposed to outside, the holding portion 12 can be reduced in size and weight as compared with the container. Note that, naturally, if the size and the weight do not cause any problem, the holding portion 12 in other forms such as a container may be provided instead of the ring body 16.

A side display 48 on which an image is displayed is provided on an outer surface of the side member 16S. The side display 48 is constituted by a liquid crystal display or an organic EL display, for example. On the side display 48, an image indicative of a present status (e.g., "during conveyance," "to turn right," or the like) of the product conveyance robot 10, an image for advertising, an image for decoration, and so on are displayed, for example. By providing such a side display 48, it is possible to alert people around the product conveyance robot 10 or advertise a product or the like.

The reason why the display is provided on a side face of the holding portion 12 is because the product conveyance robot 10 has few other suitable surfaces. That is, in a case where the holding portion 12 is formed in a square ring shape, the holding portion 12 can be reduced in weight as described above. However, since most part of a front face and a back face of the holding portion 12 is penetrated, a "surface" on which the display is to be provided is limited. In view of this, the display is provided on the side face of the holding portion 12 in the present example. Note that, naturally, in a case where the holding portion 12 has a sufficient "surface" on the front face and a rear face, e.g., in a case where the holding portion 12 is a container type, the display may be provided on the front face and the rear face of the holding portion 12.

The travel portion 14 includes one front wheel 20, one intermediate wheel 22, and one rear wheel 24 on each of the right and left sides such that the front wheel 20, the intermediate wheel 22, and the rear wheel 24 are aligned in the front-rear direction. The front wheel 20, the intermediate wheel 22, and the rear wheel 24 are connected to each other by a front link 60 and a rear link 62 (described later) (not shown in FIGS. 2, 3). The front link 60 and the rear link 62 are covered with a front link cover 28 and a rear link cover 30, respectively. When the front link 60 and the rear link 62 swing in a relative manner around the vertical turn axis Ab, the intermediate wheel 22 and the holding portion 12 can be lifted upward as illustrated in FIG. 2. This will be described later. Further, a center shaft 69, a fixed frame 80, and so on (not shown in FIGS. 2, 3) are placed between the intermediate wheels 22 provided as one pair, but they are covered with a center cover 32.

The front wheel 20 and the rear wheel 24 are constituted by mecanum wheels. The mecanum wheel is a wheel configured such that a plurality of barrel-shaped rolling elements 26 is attached along a circumferential surface of a wheel in a posture where the rolling elements 26 are inclined from an axle by 45 degrees. By providing the mecanum wheels, the product conveyance robot 10 can be moved in every direction. This will be also described later. Note that the intermediate wheel 22 is constituted by a general wheel that does not have the rolling elements 26 on its circumferential surface. Further, the configuration of the travel portion 14 described herein is one example, and the configuration may be changed appropriately, provided that the travel portion 14 can travel on a general road or an indoor passage. For example, the number of wheels is not limited to six and may be four or more than six. Further, instead of the wheels, other travel mechanisms, e.g., an endless track that is known as a brand name such as caterpillar, may be provided.

Here, as apparent from FIGS. 2, 3, two front link covers 28 are provided at an interval in the width direction in the present example A nonslip member 34 is provided on a front end face of each of the front link covers 28. The nonslip member 34 is made of a material having a friction coefficient higher than that of the front link cover 28, and the material is, for example, rubber, high-friction resin, or the like. As illustrated in FIG. 2, the nonslip member 34 makes contact with a road surface when the front link cover 28 (eventually, the front link 60) is largely inclined with its rear side being raised and the rear link cover 30 (eventually, the rear link 62) is largely inclined with its front side being raised in order to lift the holding portion 12. When the nonslip member 34 makes contact with the road surface, it is possible to prevent an unintended motion of the product conveyance robot 10 to the road surface. Further, the nonslip member 34 may be constituted by a material that is softer than the front link cover 28. With such a configuration, the nonslip member 34 also functions as a cushion member that relieves an impact when the front link cover 28 collides with a human or an object. Further, herein, the nonslip member 34 is provided only on the front end face of the front link cover 28, but instead of or in addition to the front end face of the front link cover 28, the nonslip member 34 may be provided on a rear end face of the rear link cover 30.

Figure 4:
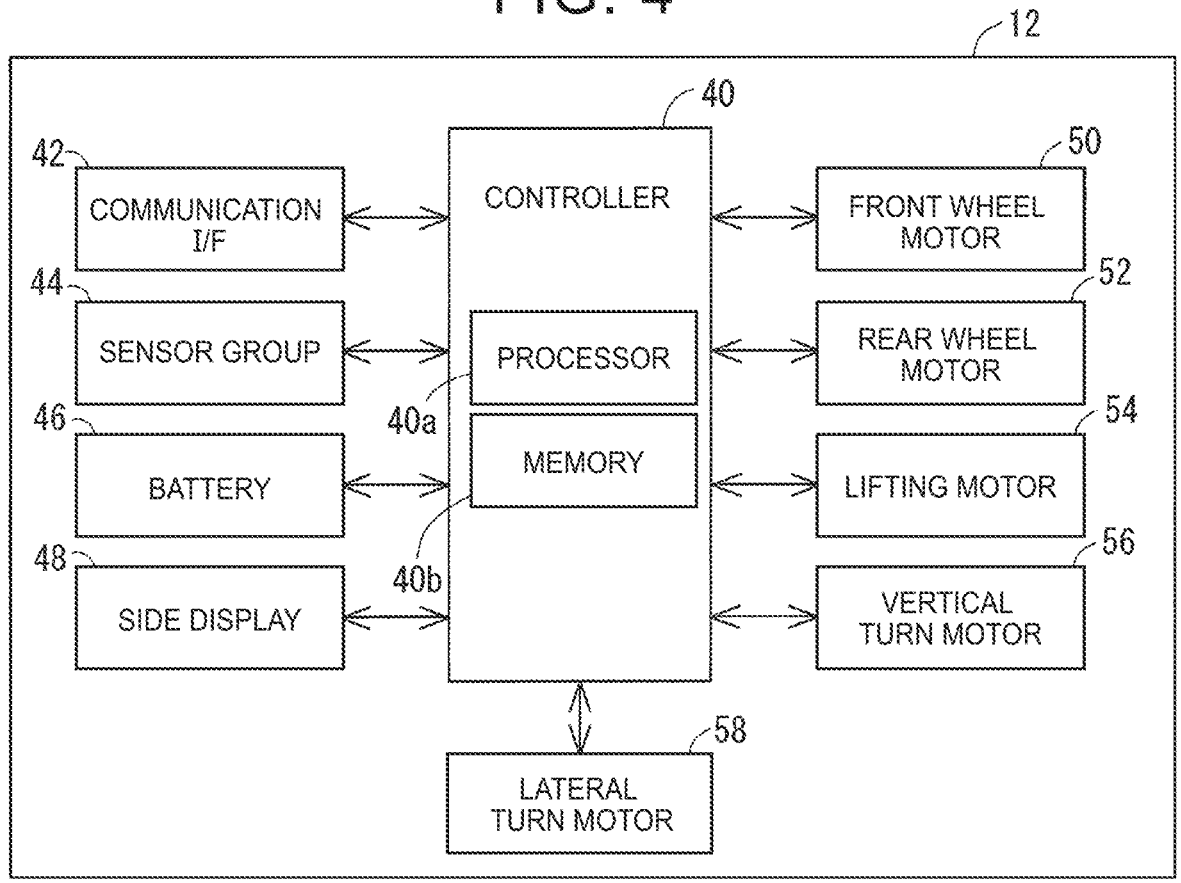
FIG. 4 is a block diagram illustrating an electrical configuration of the product conveyance robot.

Next will be described an electrical configuration of such a product conveyance robot 10 with reference to FIG. 4. The product conveyance robot 10 is provided with a communication interface (hereafter just referred to as a "communication I/F") 42 and a sensor group 44 so as to enable autonomous traveling of the product conveyance robot 10. The communication I/F 42 is configured to communicate with an external device and includes hardware for various communications including mobile data communication using a line provided by a mobile phone carrier or the like and middle-distance or short-distance wireless communication using Bluetooth (registered trademark) or the like. The external device as a communication counterpart includes, for example, a communication terminal provided in a given communication center, a mobile communication terminal owned by an individual, other product conveyance robots, and so on. The product conveyance robot 10 may acquire destination information, a traffic condition, and so on via the communication I/F 42.

The sensor group 44 includes one or more sensors configured to detect a traveling state and a surrounding environment of the product conveyance robot 10. Such a sensor group 44 includes, for example, at least one of a speed sensor, a camera, a millimeter wave radar, an infrared sensor, LiDAR, an ultrasonic sensor, a GPS sensor, an acceleration sensor, and a gyro sensor. Further, the sensor group 44 may include a sensor for detecting a posture of the holding portion 12, for example, at least one of an acceleration sensor, a gyro sensor, and an inclination sensor. A controller 40 described later drives various motors 50, 52, 54, 56, 58 based on a detection result detected by the sensor group 44 and information acquired via the communication I/F 42.

A battery 46 supplies electric power to various electric devices provided in the product conveyance robot 10. The battery 46 may be fixed to the product conveyance robot 10. In that case, the product conveyance robot 10 may include a charger for charging the battery 46 and a charger cable configured to connect the charger to an external power source. Further, the battery 46 may be freely attachable to and detachable from the product conveyance robot 10, and the battery 46 may be removed to outside the product conveyance robot 10 and charged as needed. Further, the battery 46 may be charged wirelessly. For example, a noncontact charging method in which electric power is supplied by magnetic field resonance by two sets of a coil and a capacitor may be employed such that respective coils and respective capacitors are incorporated into the product conveyance robot 10 and the outside of the product conveyance robot 10.

The side display 48 is a display placed on the side face of the holding portion 12 as described above. Displaying on the side display 48 is controlled by the controller 40. Further, although not illustrated in FIG. 4, the product conveyance robot 10 may include other output means for audibly or visually presenting information to people around the product conveyance robot 10, and the other output means includes, for example, a lamp, a speaker, a buzzer, or the like (not shown).

A front wheel motor 50 is a motor for rotationally driving the front wheel 20. One front wheel motor 50 is provided for one front wheel 20. Accordingly, two front wheel motors 50 are provided in the whole product conveyance robot 10. Similarly, a rear wheel motor 52 is a motor for rotationally driving the rear wheel 24. One rear wheel motor 52 is provided on each of the right and left sides, that is, two rear wheel motors 52 in total are provided. Note that, in this example, the front wheel 20 and the rear wheel 24 are provided with respective drive motors. However, naturally, the intermediate wheel 22 may be also provided with a drive motor. Alternatively, either one of the front wheel 20 and the rear wheel 24 may be provided with a drive motor, and the other wheels may be provided as driven wheels.

A lifting motor 54 is a motor configured to relatively swing the front link 60 and the rear link 62 around the vertical turn axis Ab so as to lift the holding portion 12 and the intermediate wheel 22. A vertical turn motor 56 is a motor configured to swing the holding portion 12 around the vertical turn axis Ab such that the holding portion 12 vertically turns. A lateral turn motor 58 is a motor configured to rotate the holding portion 12 around the lateral turn axis Aa such that the holding portion 12 laterally turns. Types of the motors 50, 52, 54, 56, 58 are not particularly limited, provided that sufficient outputs can be obtained. Note that the motors 50, 52, 54, 56, 58 may have brakes that can lock their rotations at the time when no current is applied, and the brakes are electromagnetic brakes, for example.

The controller 40 controls driving of electric devices provided in the product conveyance robot 10. The controller 40 is a microcomputer including at least a processor 40a and a memory 40b. Each function of the controller 40 is implemented such that the processor 40a executes a program stored in the memory 40b. Note that the processor 40a indicates a processor in a general sense and includes a general-purpose processor (e.g., a central processing unit (CPU) or the like) or a single-purpose processor (e.g., a graphic processing unit (GPU), an application specific integrated circuit (ASIC), a field programmable gate array (FPGA), a programmable logical device, or the like). Further, it is not necessary that the processor 40a constituting the controller 40 be physically one processor, and the processor 40a may be constituted by a plurality of processors present at positions physically separated from each other. Similarly, it is not necessary that the memory 40b be physically one element, and the memory 40b may be constituted by a plurality of memories present at positions physically distanced from each other. Further, the memory may include at least one of a semiconductor memory (e.g., a RAM, a ROM, a solid state drive, or the like) and a magnetic disk (e.g., a hard disk drive or the like).

Next will be described an operation of such a product conveyance robot 10 with reference to FIGS. 5A to 7. FIGS. 5A to 7 are schematic views of the product conveyance robot 10 viewed laterally. Note that, in FIGS. 5A to 7, the shapes of the front link 60 and the rear link 62 are illustrated in a simplified manner.

As described above and as illustrated in FIG. 5A, the holding portion 12 is rotatable around the lateral turn axis Aa extending in the height direction of the holding portion 12. In the following description, the rotation angle around the lateral turn axis Aa is referred to as a "lateral turn angle α." The lateral turn angle α becomes zero degrees when the front-rear direction of the whole product conveyance robot 10 is along the front-rear direction of the holding portion 12, that is, in the states illustrated in FIGS. 2, 5A. Further, the holding portion 12 is swingable around the vertical turn axis Ab extending in the width direction. When the holding portion 12 swings, an angle β (hereinafter referred to as a "vertical turn angle β") formed between the holding portion 12 and the rear link 62 changes.

Further, the front wheel 20, the intermediate wheel 22, and the rear wheel 24 are connected to each other via the front link 60 and the rear link 62. Further, the center shaft 69 extending along the vertical turn axis Ab is provided near the center of the travel portion 14. The front link 60 restricts a distance between the vertical turn axis Ab and the front wheel 20 and linearly connects the center shaft 69 to the front wheel 20. An axle of the intermediate wheel 22, namely, an intermediate axle 66 is fixed to the front link 60. Accordingly, a distance between the intermediate wheel 22 and the vertical turn axis Ab is also restricted. The rear link 62 restricts a distance between the vertical turn axis Ab and the rear wheel 24 and linearly connects the center shaft 69 to the rear wheel 24. The rear link 62 is swingable relative to the front link 60 around the center shaft 69 (eventually, the vertical turn axis Ab). When the rear link 62 swings relative to the front link 60, an angle γ (hereinafter referred to as a "link open angle γ") between the rear link 62 and the front link 60 is changed.

Figure 5A:
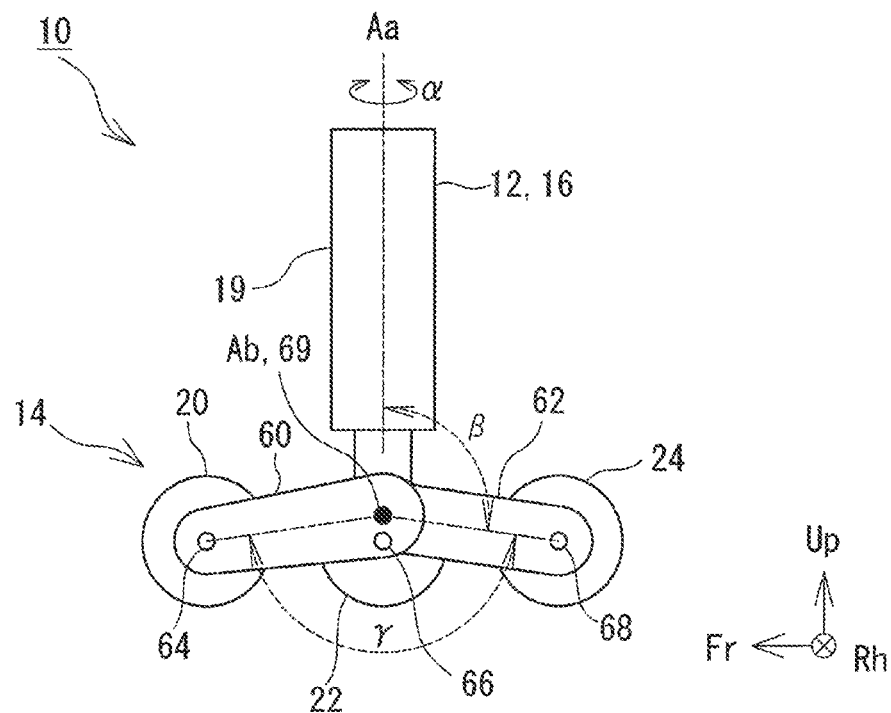
FIG. 5A is a schematic view of the product conveyance robot viewed laterally.
Figure 5B:
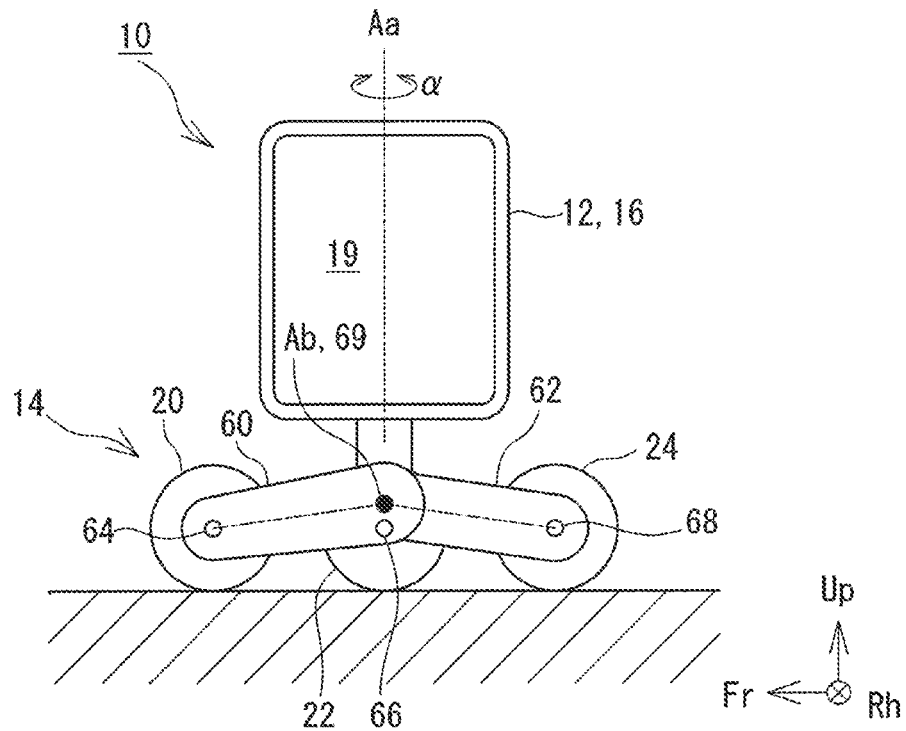
FIG. 5B is a schematic view of the product conveyance robot during traveling, the product conveyance robot being viewed laterally.

When the controller 40 causes the product conveyance robot 10 to travel, the controller 40 rotates the holding portion 12 by 90 degrees around the lateral turn axis Aa so that the side faces of the holding portion 12 face the front-rear direction of the product conveyance robot 10 and the penetration direction of the holding portion 12 faces the width direction of the product conveyance robot 10, as illustrated in FIG. 5B. Hereby, a feeling of pressure at the time of traveling of the product conveyance robot 10 can be reduced. That is, the width-direction dimension L1 of the holding portion 12 is larger than the front-rear-direction dimension L2 of the holding portion 12. On this account, in a case where the lateral turn angle α is zero degrees, that is, in a case where the front face of the holding portion 12, the front face having a large horizontal dimension, faces forward from the product conveyance robot 10, when the product conveyance robot 10 is viewed from its front side, such an impression is given that the whole product conveyance robot 10 is wide and large. When the product conveyance robot 10 in such a state approaches a user, a feeling of pressure is given to the user. Further, in this case, since the width-direction dimension L1 of the holding portion 12 is larger than the width-direction dimension L3 of the travel portion 14, the holding portion 12 protrudes outwardly from the travel portion 14 and easily interferes with other members around the holding portion 12.

In the meantime, in a case where the lateral turn angle α is 90 degrees, that is, in a case where the side face of the holding portion 12, the side face having a small horizontal dimension, faces forward from the product conveyance robot 10, when the product conveyance robot 10 is viewed from its front side, such an impression is given that the whole product conveyance robot 10 is narrow and small. In such a state, even when the product conveyance robot 10 approaches the user, a feeling of pressure to be given to the user can be made small. Further, in this case, the holding portion 12 fits inside the outer shape of the travel portion 14, so that interference of the holding portion 12 with other members can be effectively prevented.

Further, when the side face of the holding portion 12 faces the front-rear direction of the product conveyance robot 10 during traveling, people around the product conveyance robot 10 can easily watch the content displayed on the side display 48 provided on the side face of the holding portion 12. That is, in a case where the side display 48 faces the width direction of the product conveyance robot 10 (that is, the state illustrated in FIG. 5A), people should keep moving with the product conveyance robot 10 so as to be positioned on the lateral side of the product conveyance robot 10, in order to watch the content displayed on the side display 48. In the meantime, in a case where the side display 48 faces the front-rear direction of the product conveyance robot 10 (that is, the state illustrated in FIG. 5B), people can watch the content displayed on the side display 48 if they are positioned in the front-rear direction of the product conveyance robot 10, so that they do not need to move at the same speed as the product conveyance robot 10. On this account, when the side display 48 faces in the front-rear direction, more people can watch the content displayed on the side display 48 for longer time. An image displayed on the side display 48 is intended to alert people around the product conveyance robot 10 or advertise a product or the like. By causing the side display 48 to face the front-rear direction, an alerting effect or an advertising effect can be raised.

Particularly, since the holding portion 12 in the present example has a ring shape, it is difficult to provide a display on the front face and the back face of the holding portion 12. On this account, from the viewpoint of alerting and advertising, it is very advantageous that the side face of the holding portion 12 faces the front-rear direction of the robot during traveling.

Figure 6:
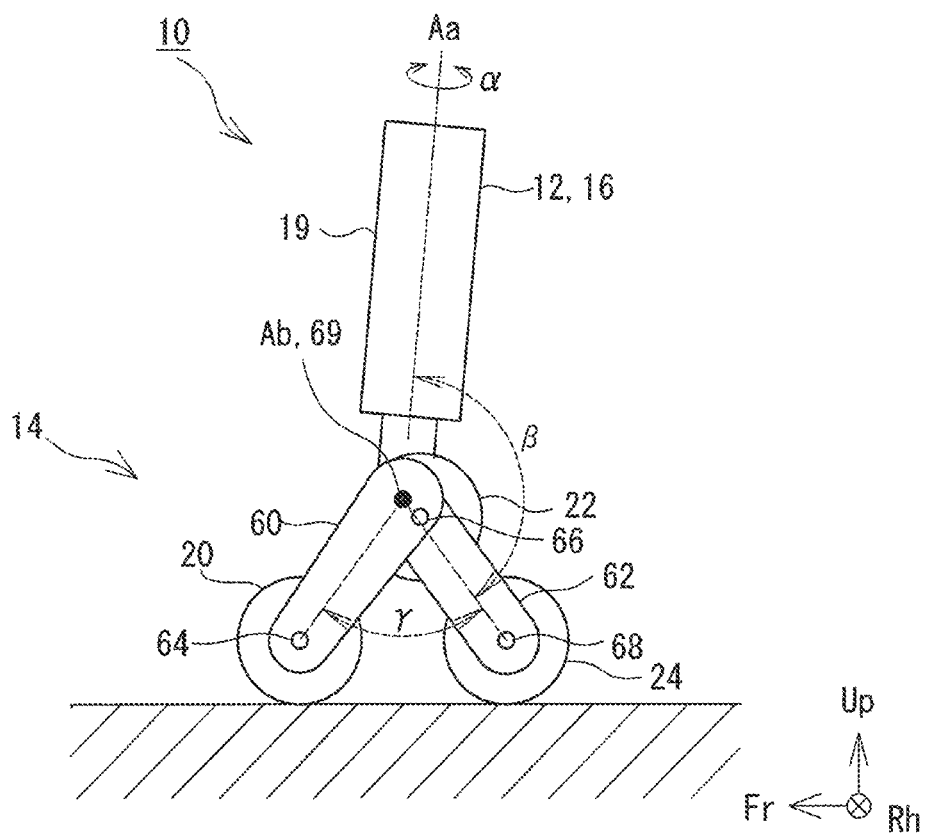
FIG. 6 is a schematic view of the product conveyance robot when a product is delivered, the product conveyance robot being viewed laterally.

In the meantime, at the time when the product conveyance robot 10 reaches a position where the product conveyance robot 10 faces a user at a delivery destination of a product and the product is delivered to the user, the controller 40 puts back the lateral turn angle α of the holding portion 12 to zero degrees so that the takeout opening 19 (that is, the through-hole) of the holding portion 12 faces forward from the product conveyance robot 10 and the side face of the holding portion 12 faces the width direction of the product conveyance robot 10, as illustrated in FIG. 6. With such a configuration, the takeout opening 19 for the product faces the front face of the user at the delivery destination. Hereby, the user at the delivery destination can take the product out of the holding portion 12 without changing the position or orientation of the user.

Further, at this time, the controller 40 may vertically turn the holding portion 12 around the vertical turn axis Ab so that the holding portion 12 is slightly inclined with its rear side being raised as illustrated in FIG. 6. In this case, the front face of the holding portion 12 faces a diagonally upper side, eventually, an area around the head of the user at the delivery destination. This posture of the product conveyance robot 10 is close to a posture when a dog or a cat in a "sitting" posture looks up in the face of a person, and therefore, a feeling of attachment and a friendly feeling to the product conveyance robot 10 can be given to the user at the delivery destination.

Further, when the product is to be delivered, the controller 40 changes the link open angle γ by swinging the front link 60 relative to the rear link 62 so that the holding portion 12 and the intermediate wheel 22 are lifted as illustrated in FIG. 6. By raising the holding portion 12, the user can easily put the product in and out of the holding portion 12. Further, by changing the link open angle γ so as to change the height of the holding portion 12, a weight increase of the product conveyance robot 10 can be prevented, and a friendly feeling of the user to the product conveyance robot 10 can be improved.

That is, in order to just change the height of the holding portion 12, it is also conceivable that an exclusive elevator mechanism is provided. For example, it is conceivable that a linear-motion mechanism using a motor and a spline shaft is provided between the travel portion 14 and the holding portion 12, and the holding portion 12 is raised and lowered by the linear-motion mechanism. However, in this case, an exclusive mechanism is required to raise and lower the holding portion 12, and this causes an increase in weight and cost.

Further, generally, people easily have a feeling of attachment or a friendly feeling to things resembling animals, particularly, a dog and a cat as pets. When a four-legged animal such as a dog or a cat greatly changes the height of its body or head, it often changes the posture of its legs. For example, a dog and a cat change their postures from a "lying-down" posture to a "sitting" posture with their forelegs vertically supporting their bodies. In the "lying-down" posture, their forelegs and back legs make contact with a ground, and their heads are placed at a low position, and in the "sitting" posture, the heads are distanced from the ground. The motion to change only the height of the holding portion 12 by use of the linear-motion mechanism without changing the posture of the travel portion 14 is greatly different from the motion of the four-legged animal, and therefore, the user hardly has a friendly feeling to the product conveyance robot 10.

In the meantime, in the present example, the motion to lift the intermediate wheel 22 and the holding portion 12 by swinging the rear link 62 relative to the front link 60 is close to the motion of the four-legged animal, particularly, the motion when a dog or a cat changes from the "lying-down" posture to the "sitting" posture, and therefore, the user easily has a friendly feeling to the product conveyance robot 10. However, naturally, the linear-motion mechanism may be provided without changing the link open angle γ, provided that the holding portion 12 can be raised and lowered. Further, in the first place, the holding portion 12 does not need to be raised and lowered, provided that the holding portion 12 is placed at an appropriate height.

Figure 7A:
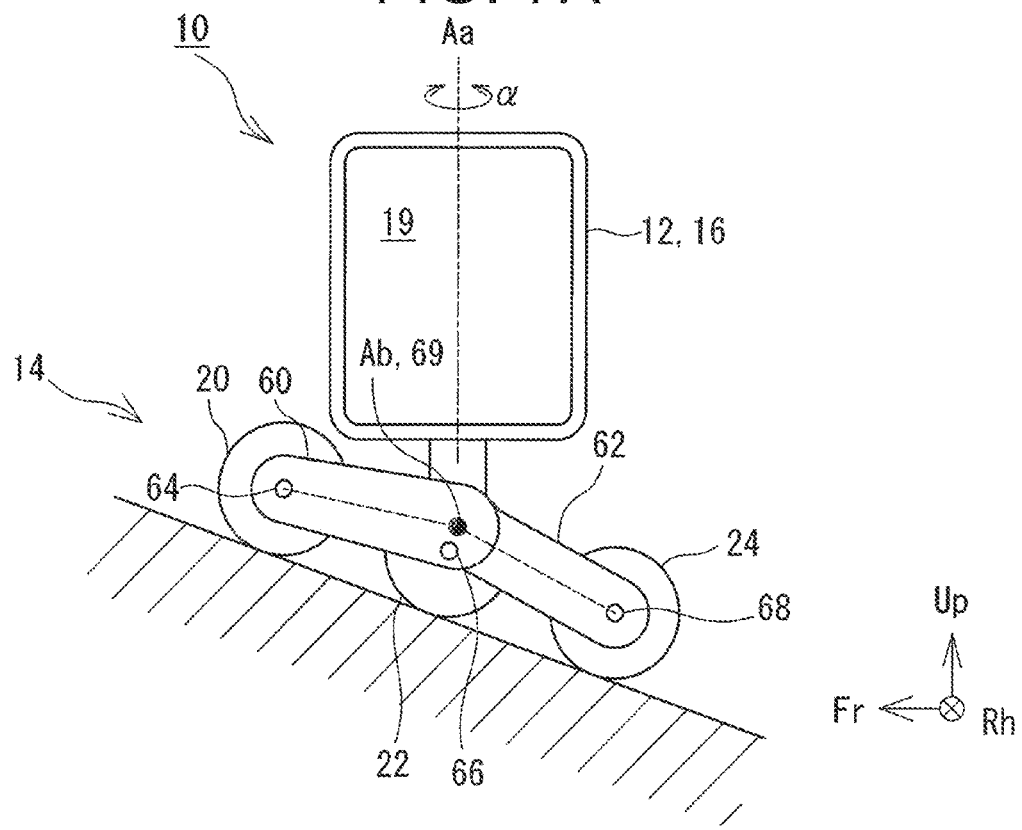
FIG. 7A is a schematic view of the product conveyance robot when the product conveyance robot travels on an inclined surface, the product conveyance robot being viewed laterally.

Further, the vertical turn of the holding portion 12 may be performed in various cases, as well as a case where the product is put in or out of the holding portion 12. For example, as illustrated in FIG. 7A, assume a case where the product conveyance robot 10 travels on an inclined surface. In this case, in order to keep the holding portion 12 horizontal, it is necessary to swing the holding portion 12 relative to the rear link 62 to change the vertical turn angle β. In view of this, at the time when the product conveyance robot 10 travels on an inclined surface, the controller 40 may drive the vertical turn motor 56 so that the holding portion 12 is kept horizontal. Note that, in order to detect an inclination angle of the holding portion 12, either or both of the holding portion 12 and the travel portion 14 may be provided with a sensor for detecting a posture, for example, an inclination sensor, an acceleration sensor, a gyro sensor, and so on. The controller 40 may control the vertical turn angle β based on a detection result from the sensor for posture detection.

Further, a message may be transferred from the product conveyance robot 10 to people around the product conveyance robot 10 by use of the vertical turn of the holding portion 12 and the lateral turn of the holding portion 12. For example, when the product conveyance robot 10 stops in front of the user at the delivery destination, the controller 40 may vertically turn the holding portion 12 so that the holding portion 12 is temporarily inclined with its upper side being raised. By performing such a motion, the user at the delivery destination can have such an impression that the product conveyance robot 10 "bows" or "nods." Further, when the user takes an unfavorable action, the controller 40 may laterally turn the holding portion 12 in a reciprocating manner from side to side. In this case, the user can have such an impression that the product conveyance robot 10 "shakes its head," and this allows the user to grasp that the user's action is inappropriate. By transferring a message to a person by the motion of the product conveyance robot 10 as such, the user can easily have an impression that the product conveyance robot 10 is like an animal, and thus, a friendly feeling to the product conveyance robot 10 improves.

Further, as mentioned earlier, the product conveyance robot 10 is provided with sensors such as a camera. When those sensors are provided in the holding portion 12 and the holding portion 12 is swung and laterally turned as needed, it is possible to change detection directions of the sensors. For example, as illustrated in FIGS. 2, 3, in a case where cameras 44a are provided on respective front end faces of the upper lateral member 16U and the lower lateral member 16L, when the holding portion 12 is rotated around the lateral turn axis Aa, the direction where the cameras 44a capture images can be changed. That is, by allowing the holding portion 12 to laterally turn, it is possible to check states in several directions without providing sensors on many surfaces.

Figure 7B:
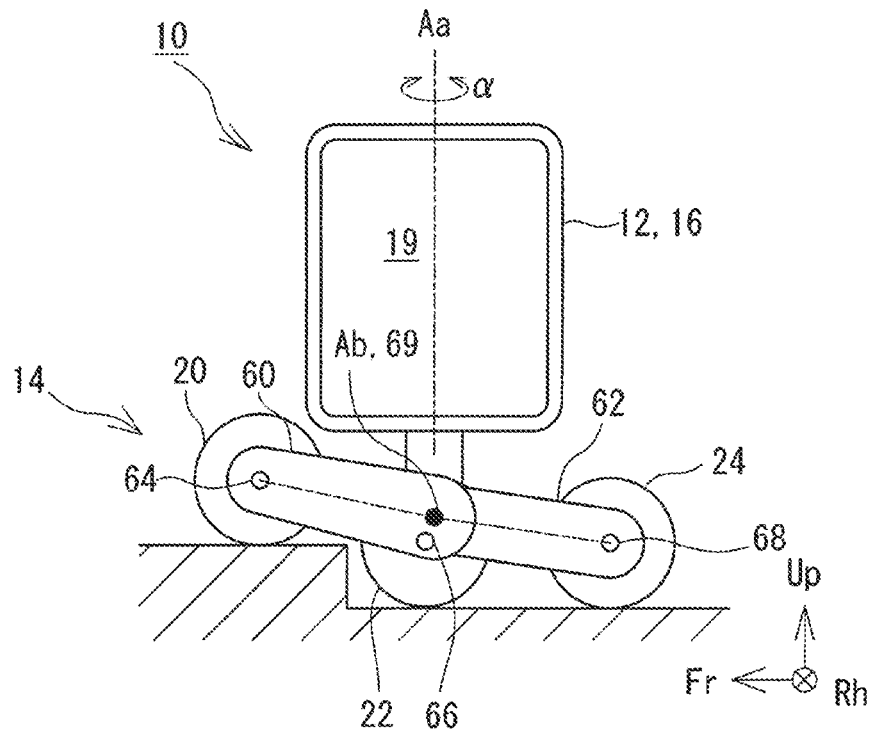
FIG. 7B is a schematic view of the product conveyance robot when the product conveyance robot climbs over a step, the product conveyance robot being viewed laterally.

Further, since three wheels connected via a link are provided on each side, the product conveyance robot 10 can travel stably on a step or an inclined surface. For example, as illustrated in FIG. 7B, when the front wheels 20 are lifted to climb over a step, the remaining intermediate wheels 22 and rear wheels 24 (that is, four wheels as the whole product conveyance robot 10) can maintain a state where they make contact with the road surface. On that account, the gravitational center of the product conveyance robot 10 becomes stable, thereby making it possible to effectively prevent fall and shaking of the product conveyance robot 10.

As apparent from the above description, in the present example, the holding portion 12 can rotate around the lateral turn axis Aa and around the vertical turn axis Ab as needed. Hereby, the posture of the holding portion 12 can be changed freely in accordance with the state of the product conveyance robot 10. Hereby, even if the holding portion 12 does not have a special design, the holding portion 12 can respond to various requests by changing its posture, thereby making it possible to reduce a restriction in design of the holding portion 12. For example, in a case where the posture of the holding portion 12 cannot be changed, the width-direction dimension L1 of the holding portion 12 should be made smaller than the width-direction dimension L3 of the travel portion 14 in order to avoid interference with other members during traveling. In the meantime, like the present example, in a case where the holding portion 12 is laterally turnable, even when the width-direction dimension L1 of the holding portion 12 is made larger than the width-direction dimension L3 of the travel portion 14, it is possible to avoid interference with other members. This reduces a restriction on the width-direction dimension L1 of the holding portion 12.

Further, when the holding portion 12 is rotatable around the lateral turn axis Aa and around the vertical turn axis Ab, the holding portion 12 can transfer a message to the user by its motion as described above. This makes it possible to improve the friendly feeling of the user to the product conveyance robot 10.

Figure 8A:
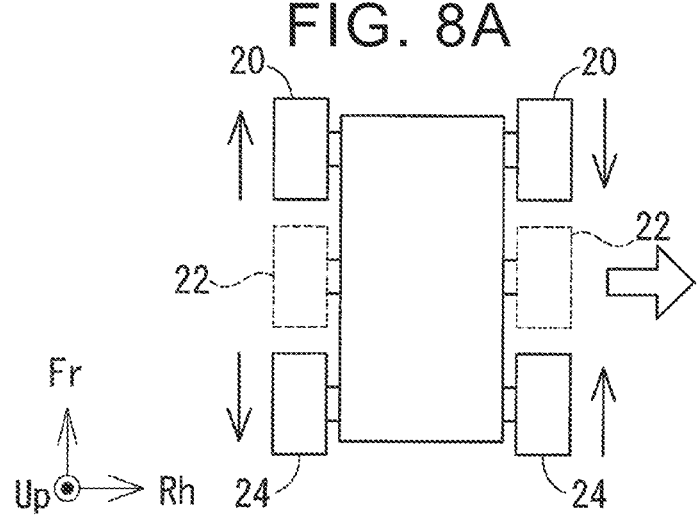
FIG. 8A is a schematic view of the product conveyance robot that moves laterally, the product conveyance robot being viewed from above.
Figure 8B:
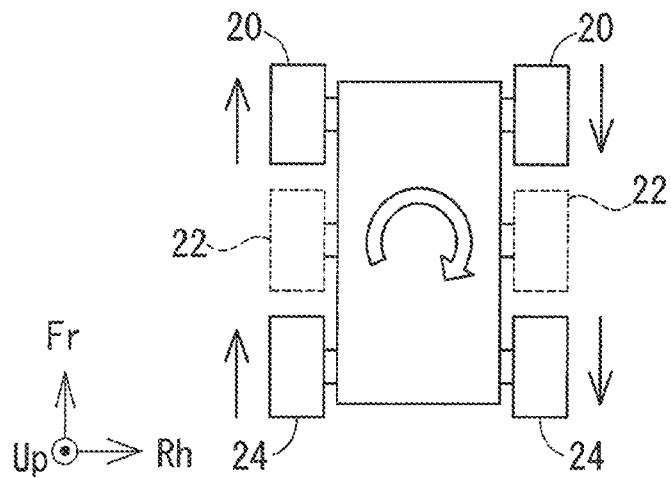
FIG. 8B is a schematic view of the product conveyance robot that turns, the product conveyance robot being viewed from above.
Figure 8C:
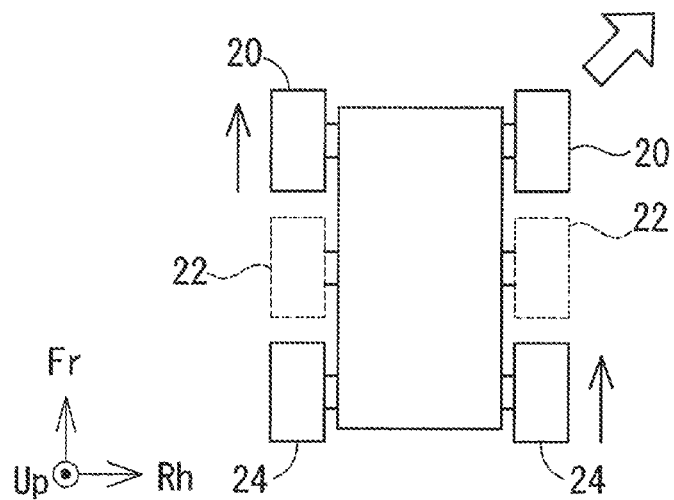
FIG. 8C is a schematic view of the product conveyance robot that moves diagonally, the product conveyance robot being viewed from above.

Next will be described omnidirectional movement of the product conveyance robot 10 by use of the mecanum wheel. In the present example, the front wheels 20 and the rear wheels 24 are constituted by mecanum wheels. Accordingly, when the intermediate wheels 22 are lifted by changing the link open angle γ, the product conveyance robot 10 can be moved in every direction. This will be described with reference to FIGS. 8A to 8C. FIGS. 8A to 8C are schematic views of the product conveyance robot 10 viewed from above. In FIGS. 8A to 8C, a blank arrow indicates an advancing direction of the product conveyance robot 10, and an arrow described beside a wheel indicates a rotation direction of the wheel. That is, an arrow directed upward on the plane of paper, described beside a wheel, indicates a rotation (hereinafter referred to as "forward rotation") in a direction where the wheel moves forward, and an arrow directed downward on the plane of paper indicates a rotation (hereinafter referred to as "rearward rotation") in a direction where the wheel moves rearward.

Here, the following case is assumed. That is, in a state where the intermediate wheels 22 are lifted, each of the front wheels 20 and the rear wheels 24 is rotated in a direction reverse to its adjacent wheel in the front-rear direction and is rotated in a direction reverse to its adjacent wheel in the right-left direction, as illustrated in FIG. 8A. That is, the front wheel 20 on one of the right and left sides (the right side in the example illustrated herein) is rotated forward, and the rear wheel 24 on the one of the right and left sides is rotated rearward. In the meantime, the front wheel 20 on the other one of the right and left sides (the left side in the example illustrated herein) is rotated rearward, and the rear wheel 24 on the other one of the right and left sides is rotated forward. In this case, the product conveyance robot 10 laterally moves toward the one of the right and left sides (the right side in the example) without changing the orientation of the product conveyance robot 10.

Further, the following case is assumed. That is, as illustrated in FIG. 8B, each of the front wheels 20 and the rear wheels 24 is rotated in the same direction as its adjacent wheel in the front-rear direction and is rotated in a direction reverse to its adjacent wheel in the right-left direction. That is, the front wheel 20 and the rear wheel 24 on one of the right and left sides (the right side in the example illustrated herein) are rotated rearward, and the front wheel 20 and the rear wheel 24 on the other one of the right and left sides (the left side in the example illustrated herein) are rotated forward. In this case, the product conveyance robot 10 can turn on the spot.

Further, as illustrated in FIG. 8C, in a case where the front wheel 20 on one of the right and left sides and the rear wheel 24 on the other one of the right and left sides are rotated forward, and the remaining front wheel 20 and the remaining rear wheel 24 are not rotated, the product conveyance robot 10 can be moved diagonally so as to move forward and toward the one of the right and left sides.

Figure 9:
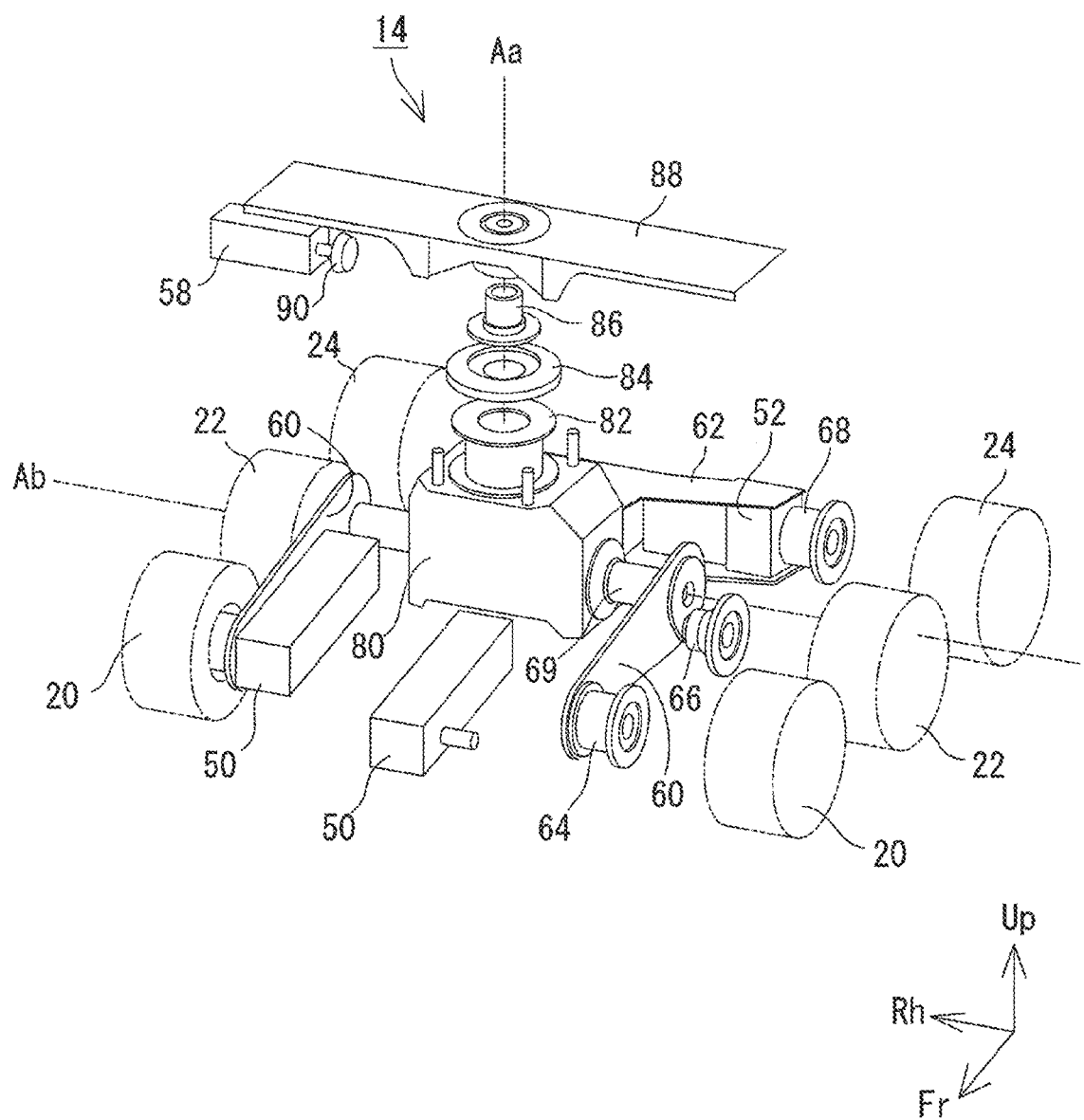
FIG. 9 is a partial exploded perspective view of the product conveyance robot from which a cover is removed, the product conveyance robot being viewed from a diagonal front side.
Figure 10:
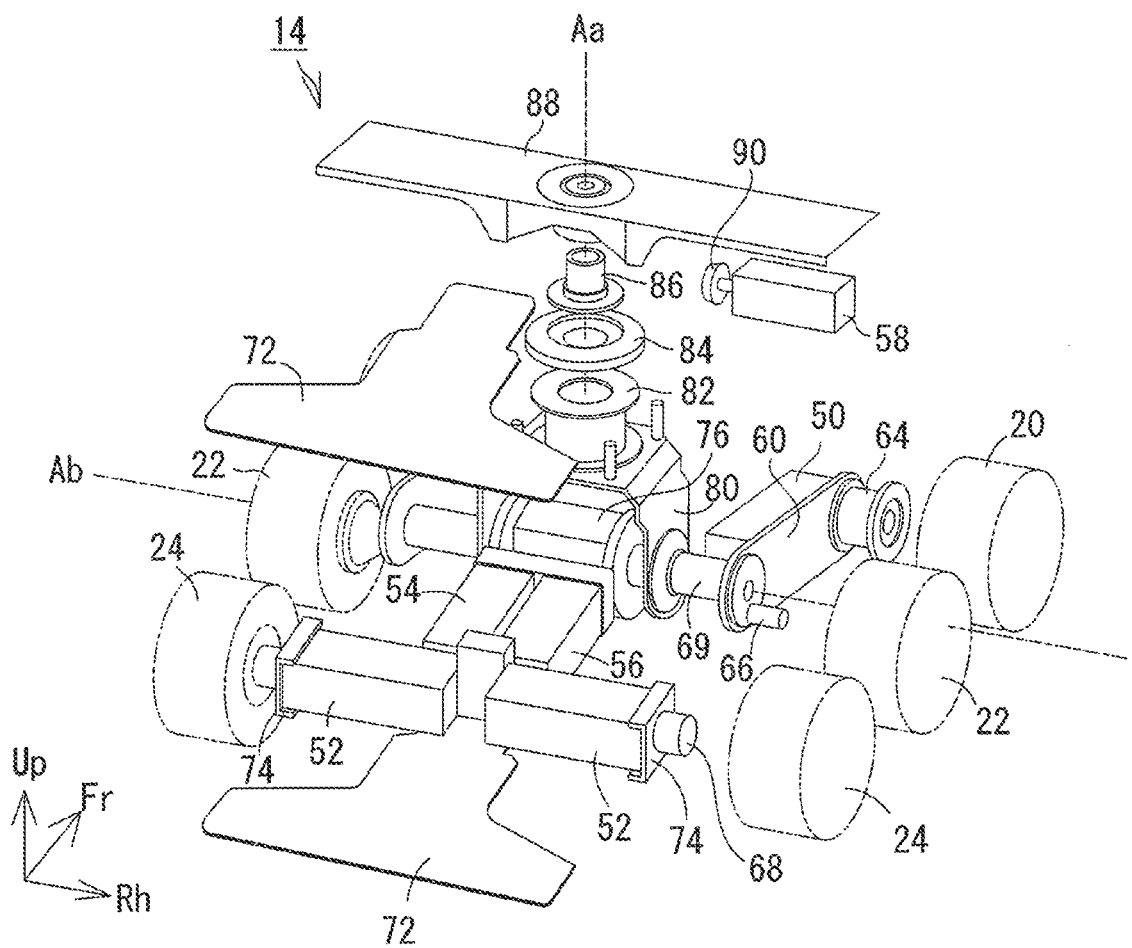
FIG. 10 is a partial exploded perspective view of the product conveyance robot from which the cover is removed, the product conveyance robot being viewed from a diagonal rear side.
Figure 11:
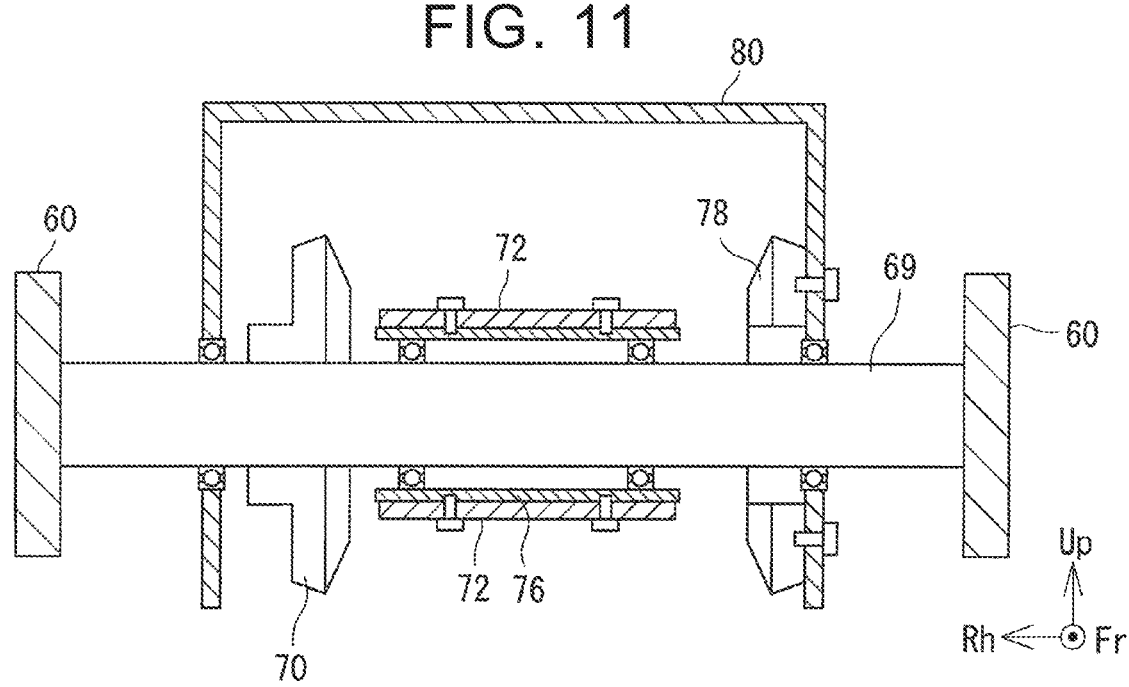
FIG. 11 is a longitudinal sectional view around a center shaft.
Figure 12:
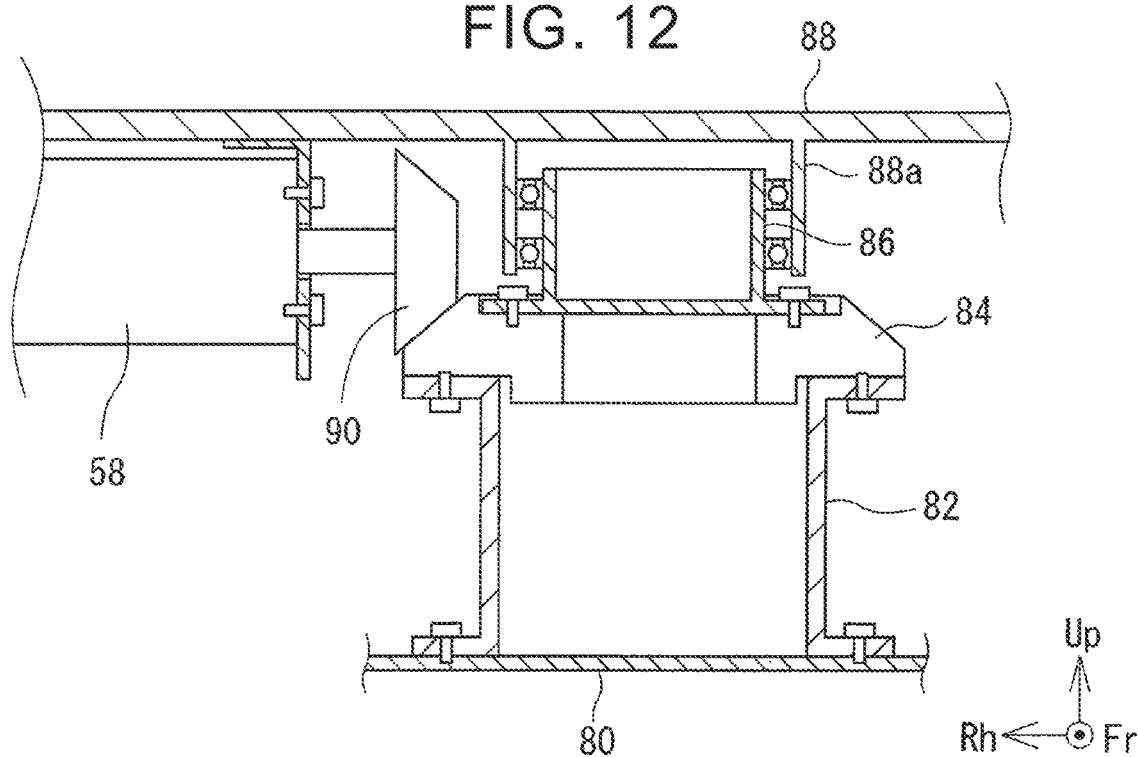
FIG. 12 is a longitudinal sectional view around a connecting shaft.

Next will be described a mechanical configuration of the travel portion 14 of such a product conveyance robot 10 with reference to FIGS. 9 to 12. FIGS. 9, 10 are partial exploded perspective views of the product conveyance robot 10 from which a cover is removed. FIG. 9 is a view in which the product conveyance robot 10 is viewed from a diagonal front side, and FIG. 10 is a view in which the product conveyance robot 10 is viewed from a diagonal rear side. Further, FIG. 11 is a longitudinal sectional view around the center shaft 69, and FIG. 12 is a longitudinal sectional view around a connecting shaft 86.

The fixed frame 80 having a generally box shape in which a rear end face and a bottom face are opened is provided in a central part of the travel portion 14. Further, the center shaft 69 is provided to cross the fixed frame 80 in the width direction. The center shaft 69 is provided at a position along the vertical turn axis Ab and in the same orientation as the vertical turn axis Ab.

The front links 60 are fixed to both ends of the center shaft 69 in the width direction. The front link 60 connects the front wheel 20 to the center shaft 69. The shape of the front link 60 is not limited particularly. In the present example, the front link 60 is a plate member placed such that its thickness direction is parallel to the width direction of the product conveyance robot 10. The intermediate axle 66 as an axle of the intermediate wheel 22 is attached to a part near a rear end of the front link 60, and a front axle 64 as an axle of the front wheel 20 is attached to a part near a front end of the front link 60. Accordingly, a relative positional relationship between the center shaft 69, the front wheel 20, and the intermediate wheel 22 is restricted by the front link 60. The front link 60 is further provided with the front wheel motor 50 configured to rotationally drive the front wheel 20.

Further, as illustrated in FIG. 10, a connection frame 76 is attached to a central part of the center shaft 69 in the axial direction such that the connection frame 76 is rotatable relative to the center shaft 69. A pair of rear link plates 72 is provided such that the rear link plates 72 are attached to a top face and a bottom face of the connection frame 76. The rear link plate 72 is a generally T-shaped plate member in a plan view such that the rear link plate 72 extends rearward from its front end and expands in the right-left direction. The rear wheel motors 52, the lifting motor 54, and the vertical turn motor 56 are placed and fixed between the rear link plates 72. The rear wheel motor 52 is a motor for rotationally driving the rear wheel 24. A connection bracket 74 is attached to an outer end portion of the rear wheel motor 52 in the width direction. A rear axle 68 as an axle of the rear wheel motor 52 is attached to the connection bracket 74. Further, the rear link plates 72 are fastened to a top face and a bottom face of the connection bracket 74 via bolts and the like. Accordingly, the connection frame 76, the rear link plates 72, and the connection bracket 74 function as the rear link 62 configured to restrict a distance between the center shaft 69 (eventually, the vertical turn axis Ab) and the rear wheel 24 and to connect the center shaft 69 to the rear wheel 24.

The lifting motor 54 is a motor configured to swing the front link 60 relative to the rear link 62 so as to lift the holding portion 12 and the intermediate wheels 22. Further, the vertical turn motor 56 is a motor configured to swing the fixed frame 80, eventually, the holding portion 12 connected to the fixed frame 80 relative to the rear link 62 around the vertical turn axis Ab. Mechanical connections of these motors to each member will be described with reference to FIG. 11.

As illustrated in FIG. 11, the connection frame 76 is rotatably attached to the center of the center shaft 69 via bearings. The rear link plates 72 are fastened to the top face and the bottom face of the connection frame 76. The lifting motor 54 and the vertical turn motor 56 (not shown in FIG. 11) are fixed to the rear link plates 72.

Further, a lifting gear 70 as an angular wheel is also attached to the center shaft 69. The lifting gear 70 is firmly connected to the center shaft 69 and rotates together with the center shaft 69. Further, the lifting gear 70 is coaxial with the center shaft 69 (eventually, the vertical turn axis Ab). An angular wheel (not shown) configured to mesh with the lifting gear 70 is attached to an output shaft of the lifting motor 54. The lifting motor 54 is fastened to the rear link plates 72, and therefore, along with rotation of the lifting motor 54, the center shaft 69 and the front link 60 together with the lifting gear 70 swing around the vertical turn axis Ab relative to the rear link 62. Hereby, the link open angle γ formed between the front link 60 and the rear link 62 is changed, and the intermediate wheels 22 and the holding portion 12 are raised and lowered.

The fixed frame 80 to which the holding portion 12 is connected is rotatably attached to the center shaft 69 via bearings. A vertical turn gear 78 as an angular wheel is attached to a side face of the fixed frame 80. The vertical turn gear 78 is coaxial with the center shaft 69 (eventually, the vertical turn axis Ab). An angular wheel (not shown) configured to mesh with the vertical turn gear 78 is attached to an output shaft of the vertical turn motor 56. Further, the vertical turn motor 56 is fastened to the rear link plates 72, and therefore, along with rotation of the vertical turn motor 56, the fixed frame 80 and the holding portion 12 together with the vertical turn gear 78 swing around the vertical turn axis Ab relative to the rear link 62.

Next will be described a mechanism configured to rotate the holding portion 12 around the lateral turn axis Aa. As illustrated in FIGS. 9, 10, a support frame 88 is provided in the travel portion 14. The support frame 88 is a member fixed to a bottom face of the ring body 16 (not shown in FIGS. 8A, 8B, 8C, 9) constituting the holding portion 12. The support frame 88 is connected to the fixed frame 80 via a fixing shaft 82, a lateral turn gear 84, and the connecting shaft 86.

That is, as illustrated in FIG. 12, the fixing shaft 82 is fastened on a top face of the fixed frame 80, and the lateral turn gear 84 as an angular wheel is fastened to a top face of the fixing shaft. Further, the connecting shaft 86 is fastened to a top face of the lateral turn gear 84. The fixing shaft 82, the lateral turn gear 84, and the connecting shaft 86 are coaxial with the lateral turn axis Aa. A cylindrical connecting rib 88a projects from a bottom face of the support frame 88, and the connecting rib 88a is rotatably connected to the connecting shaft 86 via bearings.

The lateral turn motor 58 is further attached to the bottom face of the support frame 88. The lateral turn motor 58 is a motor configured to rotate the holding portion 12 around the lateral turn axis Aa. An angular wheel 90 configured to mesh with the lateral turn gear 84 is attached to an output shaft of the lateral turn motor 58. In this case, along with rotation of the lateral turn motor 58, the support frame 88 and the holding portion 12 rotate around the lateral turn axis Aa.

Figure 13:
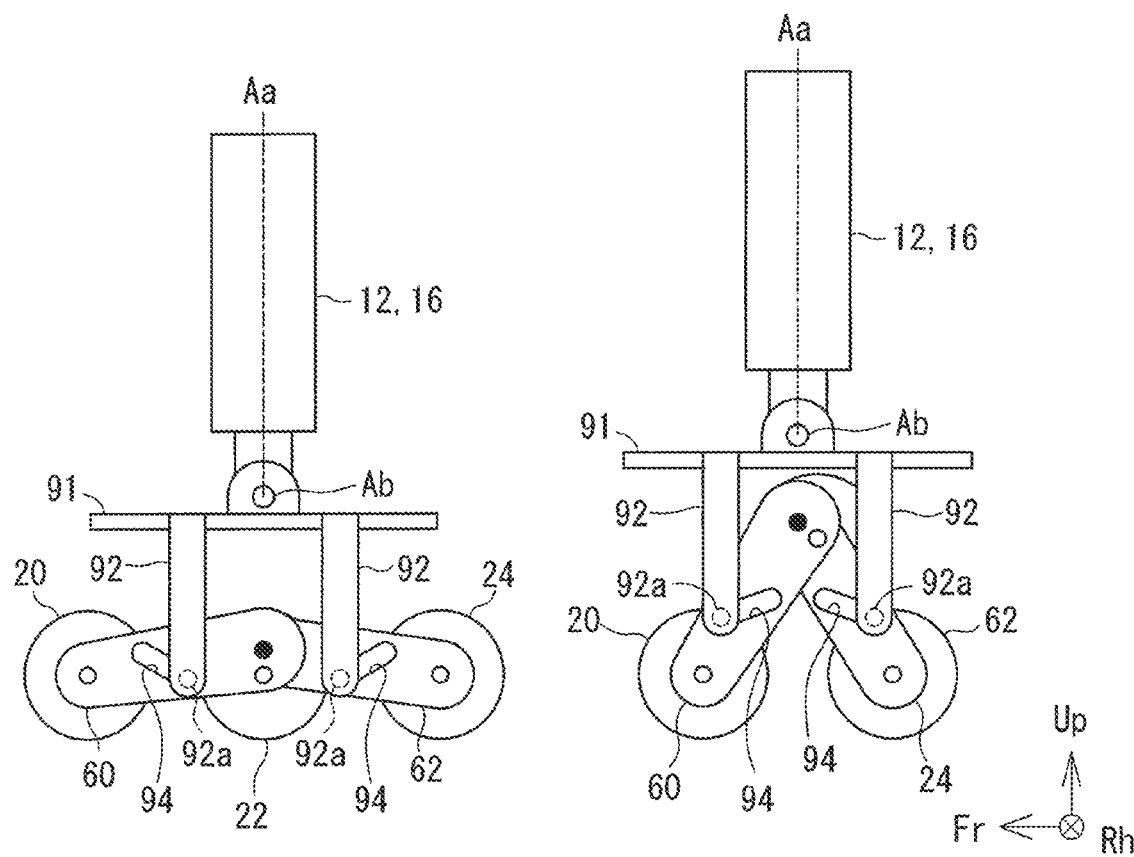
FIG. 13 is a schematic view illustrating another example of the product conveyance robot.

Note that the configuration described herein is an example and may be changed appropriately, provided that the holding portion 12 can rotate around the lateral turn axis Aa. For example, in the present example, a swinging axis (that is, the vertical turn axis Ab) for vertical turn of the holding portion 12 is along swinging axes of the links 60, 62, but they may be completely separated from each other. For example, as illustrated in FIG. 13, the support plate 91 may be provided above the front link 60 and the rear link 62, and the vertical turn axis Ab may be provided on the support plate 91. In a case of FIG. 13, the support plate 91 is connected to the front link 60 or the rear link 62 by a connecting link 92. The connecting link 92 includes a cam pin 92a configured to engage with a cam hole 94 formed in the front link 60 and the rear link 62. Further, the travel portion 14 may be configured not to include the front link 60 and the rear link 62, and may be configured, for example, to include an endless track instead of wheels.

Further, in FIG. 9, other transmission members may be used instead of the angular wheel, provided that output power of the lateral turn motor 58 can be transmitted to the support frame 88 as rotation around the lateral turn axis Aa. For example, other types of gear wheels, pulleys, and the like may be used. Further, the lateral turn motor 58 may be fixed to the fixed frame 80, instead of the support frame 88. Further, in the above description, the holding portion 12 can vertically turn and can be raised and lowered. However, the holding portion 12 may not be able to perform those operations. Further, in the present example, the product conveyance robot 10 can autonomously travel, but the product conveyance robot 10 may be remotely controlled.

What is claimed is:

1. A product conveyance robot comprising:
   a travel portion configured to travel on a road surface;
   a holding portion provided above the travel portion and configured to hold a product, the holding portion being provided rotatably around a lateral turn axis extending in a height direction of the holding portion; and
   a controller configured to control driving of the travel portion and a rotation angle of the holding portion around the lateral turn axis, wherein:

a width-direction dimension of the holding portion is larger than a front-rear-direction dimension of the holding portion;

a takeout opening via which the product is put in and out of the holding portion is provided on at least a front face of the holding portion;

the controller controls the rotation angle of the holding portion around the lateral turn axis such that both side faces of the holding portion face a front-rear direction of the product conveyance robot during traveling, and the front face of the holding portion faces forward from the product conveyance robot when the product is put in or out of the holding portion, and a side display on which an image is displayed is provided on at least one of the side faces of the holding portion.

2. The product conveyance robot according to claim 1, wherein the holding portion has a square ring body configured to penetrate the holding portion in a front-rear direction and to hold one or more products inside the ring body.

3. The product conveyance robot according to claim 1, wherein:

the holding portion is rotatable relative to the travel portion around a vertical turn axis extending in a width direction of the product conveyance robot; and the controller is configured to also control a rotation angle of the holding portion around the vertical turn axis.

4. The product conveyance robot according to claim 1, wherein:

the holding portion is rotatable relative to the travel portion above an axis extending in a width direction of the product conveyance robot; and the controller is configured to control a rotation of the holding portion about the axis in response to the product conveyance robot travelling along an inclined surface.

5. The product conveyance robot according to claim 4, further comprising a sensor configured to detect a posture of the holding portion, wherein the sensor is configured to detect whether the product conveyance robot is travelling along the inclined surface, and the sensor is attached to the travel portion or the holding portion.

6. The product conveyance robot according to claim 1, wherein the holding portion comprises a through hole extending through an entirety of the holding portion in the front-rear direction of the holding portion.

7. The product conveyance robot according to claim 1, wherein:

the controller is configured to control the travel portion to vertically raise the holding portion in response to the product conveyance robot reaching a delivery destination.

8. The product conveyance robot according to claim 7, wherein the controller is configured to control the travel portion to vertically raise the holding portion by moving a first portion of the travel portion closer to a second portion of the travel portion.

9. The product conveyance robot according to claim 1, wherein the holding portion is configured to support the product at a position where the product extends outside of the holding portion in both the front face and a rear face of the holding portion simultaneously, and the front face is offset from the rear face in the front-rear direction of the holding portion.

* * * * *